(No Model.)  2 Sheets—Sheet 1.
J. E. PELLEGRINI.
MANUFACTURE OF CRYSTALLIZABLE SUGAR BY SYNTHESIS.
No. 508,747. Patented Nov. 14, 1893.
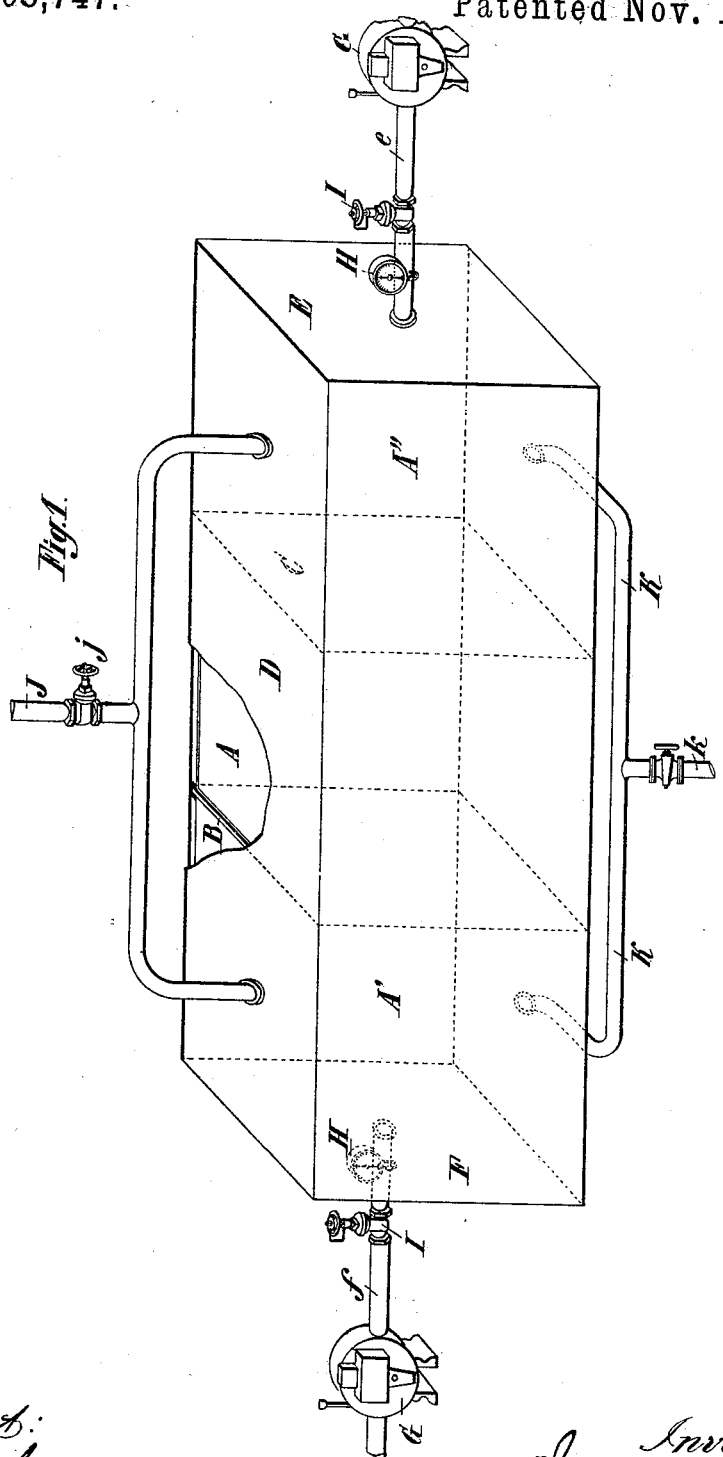

(No Model.) 2 Sheets—Sheet 2.
J. E. PELLEGRINI.
MANUFACTURE OF CRYSTALLIZABLE SUGAR BY SYNTHESIS.
No. 508,747. Patented Nov. 14, 1893.
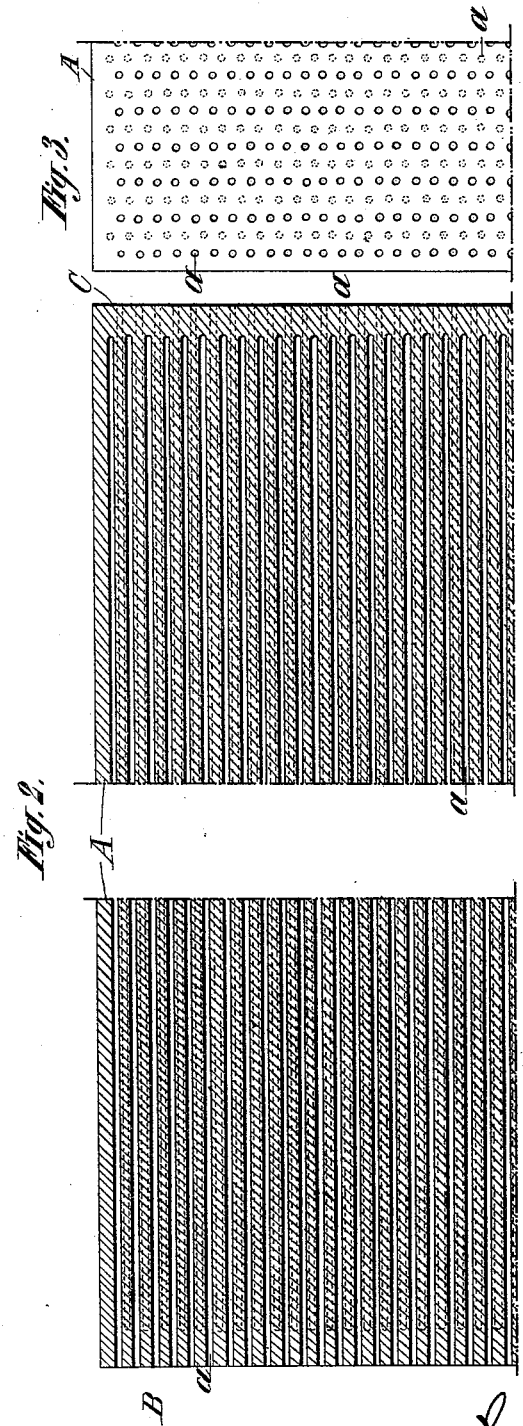

UNITED STATES PATENT OFFICE.

JEAN ERCOLE PELLEGRINI, OF PARIS, FRANCE.

MANUFACTURE OF CRYSTALLIZABLE SUGAR BY SYNTHESIS.

SPECIFICATION forming part of Letters Patent No. 508,747, dated November 14, 1893.

Application filed June 17, 1893. Serial No. 477,954. (No specimens.)

*To all whom it may concern:*

Be it known that I, JEAN ERCOLE PELLEGRINI, a subject of the King of Italy, residing at Paris, France, have invented certain new and useful Improvements in Processes of and Apparatus for Manufacturing Crystallizable Sugar by Synthesis, which invention is fully described in the following specification.

Cane sugar, or "saccharose" is composed as is well known, of three elements, namely, carbon, hydrogen and oxygen, combined in the following proportions: Carbon 42.105, hydrogen 6.433, oxygen 51.462, which gives in equivalents, carbon one hundred and forty-four divided by twelve equals 12C. Hydrogen twenty-two divided by one equals 22H. Oxygen one hundred and seventy-six divided by sixteen equals 11O. Hence the formula is $C_{12}H_{22}O_{11}$. The production of sugar, according to the present invention, being based upon synthesis, it is important to determine with precision the conditions under which these three elements combine, in order to produce the product $C_{12}H_{22}O_{11}$. The saccharose, before entering into fermentation, unites with one molecule of water in transforming itself into inverted sugar according to the following reaction:—(a) $C_{12}H_{22}O_{11} + H_2O = C_{12}H_{24}O_{12}$. During the alcoholic fermentation the sugar is converted into alcohol and carbonic acid, which is indicated by the following reaction, (b) $C_{12}H_{24}O_{12} = 4C_2H_6O + 4CO_2$. On the other hand the alcohol may be considered as a compound of ethylene and water, because the density of ethylene being 1.254 at 0° (centigrade) and at a pressure of seven hundred and sixty millimeters and that of steam being 0.806 under the same conditions, we have for each of these bodies the same volume 89.30, *i. e.*, they will combine in equal volumes and give (c) $4C_2H_6O = 4C_2H_4 + 4H_2O$. By substituting in the formula (b) $C_2H_6O$ by its value as given by formula (c) we shall obtain the formula (d) $C_{12}H_{24}O_{12} = 4CO_2 + 4C_2H_4 + 4H_2O$. But the saccharose before entering into fermentation has united with a molecule of water (formula a). Formula d may therefore be written thus:

$C_{12}H_{24}O_{12} - H_2O = 4CO_2 + 4C_2H_4 + (4H_2O - H_2O)$
$C_{12}H_{22}O_{11} = 4CO_2 + 4C_2H_4 + 3H_2O$.

Which brings us to the conclusion that the saccharose may be considered as being formed of four molecules carbon dioxid, four molecules of ethylene, and three molecules of water. This conclusion is in perfect accord with the principle of combination of bodies, according to which the weights and volumes of bodies that combine are equal, or are multiples of one another.

In the present case we find

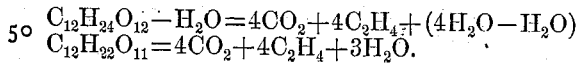

By transforming into volumes we have $$4CO_2 \ldots \ldots 89.06$$
$$4C_2H_4 \ldots \ldots 89.31.$$

The difference between the two volumes is so slight that they may be regarded as equal.

The theories developed above lead us to infer that the formula $4CO_2, 4C_2H_4, 3H_2O$, expresses the composition of crystallizable sugar.

The present invention, has for its object the manufacture of crystallizable sugar synthetically based upon the combination of the three bodies. Carbon dioxid, ethylene and water brought together under special conditions and in the proportions indicated by the formula $4CO_2, 4C_2H_4, 3H_2O$, which, as has been demonstrated, must be considered as expressing the composition of crystallizable sugar. Osmose constitutes one of the practical means by which the synthesis of the three bodies may be effected, and it is the means which I preferably adopt in practice. To carry out this process I have designed an apparatus shown in the accompanying drawings, in which—

Figure 1, is a perspective view; Fig. 2, a longitudinal section of part of the block of porous material, and Fig. 3, a front elevation of part of the block.

I take a cube or block A of pumice stone which, as is known, is very porous and very permeable by gases. In the interior of this block is cut a series of channels $a$, shown in Fig. 2, starting from the face B and stopping at about twenty millimeters from the face C, and another series starting from face C which stops within twenty millimeters from face B (shown by dotted lines). These channels which are about three millimeters in diameter, are parallel and arranged in the form of a quincunx. The cube thus prepared is carefully washed with water acidulated by sulphuric acid, and then with pure water to remove all trace of acid. After having been dried in an oven it is boiled for an hour in a solution of bichloride of platinum, the effect of which is to increase the porosity of the pumice stone. The cube is then calcined in a muffle-furnace heated to redness. When the block is cooled it is placed in a rectangular box D, of cast iron (or other suitable material) of an interior length three times greater than that of the block, but whose width and height are the same as the corresponding dimensions of the block. The block A is placed in the middle of the box D, so that the channels $a$ are horizontal and range lengthwise of the box. It is held between two plates of steel, pierced with holes corresponding with those of the block, in such way that the gases which (as will be seen hereinafter) enter each chamber A′ A″ will penetrate on either side into the block by the channels $a$ cut therein. The interior of the case is planed and nickel-plated, and is hermetically closed so that no gas can escape. From the ends E and F of the box issue the tubes $e\,f$ one of which carries the carbonic acid gas, and the other the ethylene. Upon each tube are placed devices which allow the regulation of the flow or proportions of gas admitted. For instance, a meter G to measure the volume, a pressure gage H and a regulating cock I are shown in Fig. 1. At the upper part of the apparatus is a pipe J which conveys steam. The pipe is divided into two branches, each of which carries steam to the middle of one of the chambers A′, A″. A cock $j$ is placed in the pipe J. In the bottom of the box are placed similar pipes K, which serve to drain the box. Pipes K are provided with a cock $k$.

To carry on the operation, cocks $j$ and $k$ are closed, and cocks I are opened. The ethylene is then forced with high pressure into the chamber A′ and the carbon dioxid into chamber A″. By means of the devices referred to, the quantity of the two gases is regulated to obtain equal volumes. After a few moments cock $j$ is opened and steam at a pressure equal to that of the two gases is admitted to the chambers A′ A″. The apparatus becomes quickly heated. The gases are supplied for about half an hour and they mix by osmose through the block A. At the end of the period indicated a sirup containing from twenty to twenty-five per cent. of sugar is withdrawn in amount equal to the capacity of one of the two chambers A′, A″. The apparatus is then allowed to cool and a new operation may be started. The saccharine juices thus obtained are then treated by the ordinary processes used in refineries.

Such is the apparatus by means of which the synthesis of sugar is obtained by osmose from ethylene, carbon dioxid and water.

Having thus described my invention, what I claim is—

1. The method of producing crystallizable sugar synthetically by combining carbon dioxid, ethylene, and water, in the proportions indicated by the formula, $4CO_2, 4C_2H_4, 3H_2O$, substantially as described.

2. The method of producing crystallizable sugar synthetically by combining carbon dioxid, ethylene, and water by osmose, that is to say causing the gaseous bodies to diffuse and mix through a porous medium, substantially as described.

3. The method of producing crystallizable sugar synthetically by forcing carbon dioxid and steam into a porous block from one side, and ethylene and steam into the same block from another side, thereby causing the gaseous bodies to mix by osmose, substantially as described.

4. The apparatus herein described for effecting the production of sugar synthetically, said apparatus comprising a block of pumice stone, channeled and platinized, the channels being in two series, starting from opposite sides, a tight vessel containing said block and having a chamber on each side thereof, each chamber communicating with one series of channels, and means for supplying and regulating the quantity of the gaseous bodies admitted to the two chambers, substantially as described.

In testimony whereof I have signed this specification in the presence of two subscribing witnesses.

JEAN ERCOLE PELLEGRINI.

Witnesses:
ROBT. M. HOOPER,
JEAN VICTOR BARTANEZ.